United States Patent [19]

Barnes

[11] 4,180,477
[45] Dec. 25, 1979

[54] LUMINESCENT MATERIALS

[75] Inventor: Roderick G. L. Barnes, Royston, England

[73] Assignee: Johnson, Matthey & Co., Limited, London, England

[21] Appl. No.: 870,248

[22] Filed: Jan. 17, 1978

[30] Foreign Application Priority Data

Jan. 19, 1977 [GB] United Kingdom ............... 02109/77

[51] Int. Cl.$^2$ .............................................. C09K 11/46
[52] U.S. Cl. .............................................. 252/301.4 R
[58] Field of Search ................................. 252/301.4 R

[56] References Cited

U.S. PATENT DOCUMENTS 3,717,584   2/1973   Byler et al. ................... 252/301.4 R

FOREIGN PATENT DOCUMENTS 46-32161   9/1971   Japan ................................. 252/301.4 R
50-97590   8/1975   Japan ................................. 252/301.4 R

OTHER PUBLICATIONS

Krasmoperov et al., "Chem. Abstracts", vol. 85, 1976, 184251s.
Koga, "Chem. Abstracts", vol. 81, 1974, 97658d.
Bagdasarov et al., "Soviet Physics-Doklady," vol. 19, No. 10, pp. 671–673, 1975.
Philips, "Chem. Abstracts", vol. 81, 1974, 83550a.

Primary Examiner—Jack Cooper
Attorney, Agent, or Firm—Cushman, Darby & Cushman

[57] ABSTRACT

This invention relates to luminescent materials, frequently known as "Phosphors" and suitable for use in cathode ray tubes where a high brightness display is required, for example, in the cockpit of an aircraft.

In particular the luminescent material of the invention comprises a luminescent material comprising an aluminium garnet host material optionally including at least one of the elements scandium and gallium and activated by trivalent terbium and having a composition according to the formula $RE_3Al_{(5-(y+z))}Sc_yGa_zO_{12}$:Tb, in which RE is one or more of the elements yttrium, gadolinium, lutetium and bismuth and y and z typically have values in the ranges $0 \leq y \leq 2$ and $0 \leq z \leq 5$.

2 Claims, No Drawings

LUMINESCENT MATERIALS

This invention relates to luminescent materials, especially to such materials which may be used in cathode-ray tubes in which a high-brightness display is required, for example, in the cockpit of an aircraft.

Luminescent materials, often known as "phosphors" or "phosphor materials", are chemical compounds which, as a result of stimulation or excitation by electromagnetic radiation of a certain wavelength, or by a beam of cathode rays, emit radiation typically in the visible region of the spectrum. The exact chemical nature of a phosphor determines its absorption and emission characteristics and other properties, such as its brightness and its efficiency, by which is meant the amount of light emitted relative to the amount of excitation radiation.

It is desirable for a cathode ray tube for use in an aircraft cockpit, for example, to be coated with a phosphor which emits light predominantly in the green region of the spectrum, because the human eye is particularly sensitive to radiation falling within this wavelength band. Furthermore, it is desirable that the phosphor is capable of emitting light having a high brightness. This may be accomplished by using high-energy excitation radiation, but a disadvantage of phosphors used up to now—such as $Zn_2SiO_4$:Mn, known internationally as "P1" phosphor—is that, under such high-excitation conditions, they tend to have a limited useful life due to degradation and burning.

Accordingly, it is an object of the present invention to provide a novel phosphor composition which does not suffer, under high excitation conditions, from the disadvantages referred to above and which is otherwise suitable for coating the screen of a cathode ray tube for use in, for example, an aircraft cockpit.

According to a first aspect of the invention, a luminescent material comprises an aluminium garnet host material optionally including at least one of the elements scandium and gallium and activated by trivalent terbium and having a composition according to the formula $RE_3Al_{(5-(y+z))}Sc_yGa_zO_{12}$:Tb in which RE is one or more of the elements yttrium, gadolinium, lutetium and bismuth and y and z typically have values in the ranges $0 \leq y \leq 2$ and $0 \leq z \leq 5$.

Preferably, terbium is present in an amount equivalent to 0.01–0.5 mole per mole of host material.

Hence, an alternative formula for the composition is $RE_{(3-x)}Tb_xAl_{(5-(y+z))}Sc_yGa_zO_{12}$ in which RE, y and z are as defined above and x lies between 0.01 and 0.5.

One particular phosphor according to the first aspect of the invention has the formula $Y_3Al_4ScO_{12}$:Tb. This phosphor has enhanced resistance to degradation and burning under high-excitation conditions compared to prior art phosphors.

According to a second aspect of the invention, a luminescent material comprises an aluminium garnet host material activated by trivalent terbium according to the first aspect of the invention in combination with a composition of formula $XRE_2O_3$, where X is less than or equal to 0.05 and RE is one or more of the elements yttrium gadolinium, lutetium and bismuth.

One particular phosphor according to the second aspect of the invention has the formula $Y_3Al_5O_{12}0.02Y_2O_3$:Tb. This phosphor has enhanced brightness compared to a phosphor without the $0.02\ Y_2O_3$.

According to a third aspect of the invention, a luminescent material comprises a rare earth aluminium garnet host material according to the first and second aspects of the invention and activated by trivalent terbium and cerium, in which terbium is present in an amount equivalent to 0.01–0.5 mole per mole of host material, and cerium is present in an amount equivalent to 0–50 mole percent of the terbium.

One particular phosphor according to the third aspect of the invention has the formula $Y_{2.9}Tb_{0.09}Ce_{0.01}Al_4GaO_{12}$. This phosphor has enhanced brightness compared to a phosphor without the Ce.

Phosphors according to the invention may be prepared by any of the methods well-known in the art. For example, and by preference, they may be prepared by the coprecipitation technique as described in the accompanying Examples.

EXAMPLE 1

5.241 of yttrium oxide, 0.268 g of terbium oxide and 1.650 of scandium oxide are dissolved in about 30 ml. of moderately concentrated nitric acid. The solution is combined with a solution of aluminium nitrate containing 1.506 g of aluminium. This combined solution is added slowly to about 500 ml of water which is stirred continuously, while simultaneously adding dilute ammonium hydroxide solution sufficient to maintain the reactant mixture at a pH of about 8. When the resultant precipitation is complete, the precipitate is allowed to digest and is then filtered off, washed and oven dried. After crushing to a uniform powder, this is fired at 700° C. in air for about 1 hour, crushed again and refired at 1550° C. in air for about 16 hours to give a phosphor according to the invention with a composition of $Y_{2.91}Tb_{0.09}Sc_{1.5}Al_{3.5}O_{12}$.

EXAMPLE 2

4.203 g of yttrium oxide, 0.213 g of terbium oxide and 0.874 g of scandium oxide are dissolved in about 25 ml of moderately concentrated nitric acid. The solution is combined with a solution of gallium nitrate containing 3.535 g of gallium, and is then treated according to the method of Example 1, except that the dried precipitate is fired at 700° C. in air for about 1 hour, crushed and refired at 1450° C. in air for about 16 hours to give a phosphor according to the invention with a composition of $Y_{2.91}Tb_{0.09}ScGa_4O_{12}$.

EXAMPLE 3

18.371 g of yttrium oxide, 11.197 g of gadolinium oxide and 1.285 g of terbium oxide are dissolved in about 100 ml of moderately concentrated nitric acid. The solution is combined with a solution of aluminium nitrate containing 10.305 g of aluminium, and is then treated according to the method of Examples 1 and 2, except that the dried precipitate is fired at 600° C. in air for about 1 hour, crushed and refired at 1500° C. in air for about 16 hours to give a phosphor according to the invention with a composition of $Y_{2.11}Gd_{0.8}Tb_{0.09}Al_5O_{12}$.

EXAMPLE 4

0.665 g of yttrium oxide, 2.577 g of lutetium oxide and 0.109 g of terbium oxide are dissolved in about 10 ml of moderately concentrated nitric acid. The solution is combined with a solution of aluminium nitrate containing 0.874 g of aluminium, and is then treated according to the method of Examples 1 to 3, except that the dried precipitate is fired at 1200° C. in air for about 1 hour, crushed and refired at 1550° C. in air for about 6 hours to give a phosphor according to the invention with a composition of $Y_{0.91}Lu_2Tb_{0.09}Al_5O_{12}$.

EXAMPLE 5

2.339 g of yttrium oxide, 2.495 g of bismuth oxide and 0.180 g of terbium oxide are dissolved in about 30 ml of moderately concentrated nitric acid. The solution is combined with a solution of gallium nitrate containing 3.734 g of gallium. This combined solution is added slowly to about 500 ml of water which is stirred continuously, while simultaneously adding ammonium carbonate solution sufficient to maintain the reactant mixture at a pH of about 75. When the resultant precipitation is complete, the precipitate is allowed to digest and is then filtered off, washed and oven dried. After crushing to a uniform powder this is fired at 800° C. in air for about 1 hour, crushed again and refired at 1000° C. in air for about 6 hours to give a phosphor according to the invention with a composition of $Y_{1.91}BiTb_{0.09}Ga_5O_{12}$.

EXAMPLE 6

55.484 g of yttrium oxide and 2.783 g of terbium oxide are dissolved in about 250 ml of moderately concentrated nitric acid. The solution is combined with a solution of aluminium nitrate containing 22.320 g of aluminium, and is then treated according to the method of Examples 1 to 4, except that the dried precipitate is fired at 600° C. in air for about 2 hours, crushed and refired at 1425° C. in air for about 20 hours to give a phosphor according to the invention with a composition of $Y_{2.91}Tb_{0.09}Al_5O_{12}0.02Y_2O_3$.

EXAMPLE 7

2.181 g of yttrium oxide and 0.112 g of terbium oxide are dissolved in about 10 ml of moderately concentrated nitric acid. The solution is combined with solutions of cerous nitrate and aluminium nitrate containing 0.0093 g of cerium and 0.899 g of aluminium respectively. The combined solution is then treated according to the method of Examples 1 to 4 and Example 6, except that the dried precipitate is fired at 1200° C. in air for about 1 hour, crushed and refired at 1450° C. in air for about 16 hours to give a phosphor according to the invention with a composition of $Y_{2.9}Tb_{0.09}Ce_{0.01}Al_5O_{12}$.

What we claim is:

1. A luminescent material having the formula $Y_{2.91}Tb_{0.09}Al_5O_{12}(Y_2O_3)_{0.02}$.

2. A luminescent material comprising an aluminum garnet host material activated by trivalent terbium having a composition of the formula:

$$RE_{(3-x)}Tb_xAl_{(5-z)}Ga_zO_{12}(RE_2O_3)_w$$

in which RE is one or more of the elements yttrium, gadolinium, lutetium and bismuth, z has a value in the range of $0 \leq z \leq 5$, w has a value in the range of $0.02 \leq w \leq 0.05$ and x lies between 0.01 and 0.5, said luminescent material having enhanced brightness when compared to the corresponding material without the $RE_2O_3$.

* * * * *